United States Patent
Gottumukkal et al.

(10) Patent No.: US 10,861,163 B2
(45) Date of Patent: *Dec. 8, 2020

(54) SYSTEM AND METHOD FOR IDENTIFICATION AND SUPPRESSION OF TIME VARYING BACKGROUND OBJECTS

(71) Applicant: Sensormatic Electronics, LLC, Boca Raton, FL (US)

(72) Inventors: Rajkiran Kumar Gottumukkal, Bengaluru (IN); Ian Westmacott, Tewksbury, MA (US); Matthew A. Gruenke, Waltham, MA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/589,666

(22) Filed: Oct. 1, 2019

(65) Prior Publication Data

US 2020/0034974 A1 Jan. 30, 2020

Related U.S. Application Data

(63) Continuation of application No. 15/873,080, filed on Jan. 17, 2018, now Pat. No. 10,475,191.

(51) Int. Cl.
*H04N 7/18* (2006.01)
*G06T 7/194* (2017.01)
(Continued)

(52) U.S. Cl.
CPC .......... *G06T 7/194* (2017.01); *G06K 9/00664* (2013.01); *G06K 9/00771* (2013.01); *G08B 13/19602* (2013.01); *G08B 13/19608* (2013.01)

(58) Field of Classification Search
CPC ........... G06T 7/194; G06T 2207/10024; G06T 7/254; G06T 7/246; G06T 2207/30232;
(Continued)

(56) References Cited

U.S. PATENT DOCUMENTS 7,280,673 B2 10/2007 Buehler et al.
8,098,888 B1 1/2012 Mummareddy et al.
(Continued)

FOREIGN PATENT DOCUMENTS

EP 1 520 257 4/2005
WO WO 2004/003847 1/2004

OTHER PUBLICATIONS

Chowdhury et al, Human detection and localization in secure access control by analysing facial features (Year: 2016).*
(Continued)

*Primary Examiner* — Shan E Elahi
(74) *Attorney, Agent, or Firm* — HoustonHogle LLP

(57) ABSTRACT

A system and method for identification and suppression of time varying background objects is disclosed. A proposed surveillance security system includes an image analytics system and at least one surveillance camera. The image analytics system identifies objects within image data of a scene captured by the surveillance camera, and then analyzes the objects to determine whether each object is a foreground object or a dynamic background object. In examples, the image analytics system determines whether an object is a foreground object or a dynamic background object based upon movement and/or an appearance of the object. The surveillance security system does not send alerts to users of the system for objects determined to be dynamic background objects. When users request objects of interest, the dynamic background objects are also excluded from lists of objects sent in reply messages to the users.

17 Claims, 12 Drawing Sheets

(51) Int. Cl.
  *G08B 13/196* (2006.01)
  *G06K 9/00* (2006.01)
(58) Field of Classification Search
  CPC .... G06T 2207/10016; G08B 13/19608; G08B 13/19602; G06K 9/00664; G06K 9/00771
  USPC .......................................................... 348/152
  See application file for complete search history.

(56) References Cited

U.S. PATENT DOCUMENTS

| | | | |
|---|---|---|---|
| 8,314,732 | B2 | 11/2012 | Oswald et al. |
| 8,395,682 | B2 | 3/2013 | Solomon |
| 8,433,101 | B2 | 4/2013 | Xu et al. |
| 8,468,244 | B2 | 6/2013 | Redlich et al. |
| 8,600,172 | B2 | 12/2013 | Sengupta et al. |
| 9,147,132 | B2 | 9/2015 | Marchisio et al. |
| 9,911,033 | B1 | 3/2018 | Harary et al. |
| 2009/0254572 | A1 | 10/2009 | Redlich et al. |
| 2010/0026802 | A1 | 2/2010 | Titus et al. |
| 2010/0109938 | A1 | 5/2010 | Oswald et al. |
| 2010/0250497 | A1 | 9/2010 | Redlich et al. |
| 2012/0062732 | A1 | 3/2012 | Marman et al. |
| 2013/0083312 | A1* | 4/2013 | Baraniuk .............. G01J 5/0834 356/51 |
| 2014/0112537 | A1 | 4/2014 | Frank et al. |
| 2014/0218520 | A1* | 8/2014 | Teich .................. H04N 5/2354 348/143 |
| 2014/0321746 | A9* | 10/2014 | Dunlop .................. G06K 9/036 382/173 |
| 2015/0249807 | A1 | 9/2015 | Naylor et al. |
| 2016/0266577 | A1 | 9/2016 | Kerzner |
| 2017/0052539 | A1 | 2/2017 | Kerzner |
| 2017/0262702 | A1 | 9/2017 | Saptharishi et al. |
| 2017/0270674 | A1 | 9/2017 | Shrivastava |
| 2018/0270427 | A1* | 9/2018 | Damstra ................ H04N 21/80 |
| 2018/0286075 | A1* | 10/2018 | Jones ........................ G06T 7/13 |

OTHER PUBLICATIONS

Stauffer, C., et al., "Adaptive Background Mixture Models for Real-Time Tracking," The Artificial Intelligence Laboratory—Massachusetts Institute of Technology, 1-7 (1999).

Chowdhury, M. et al., "Human Detection and localization in secure access control by analysing facial features," IEEE, 1311-1316 (2016).

Ez-Zahout, A., et al., "A framework for big data analytics in secure network of video surveillance systems based on image indexation," IEEE, 1-5 (2017).

* cited by examiner

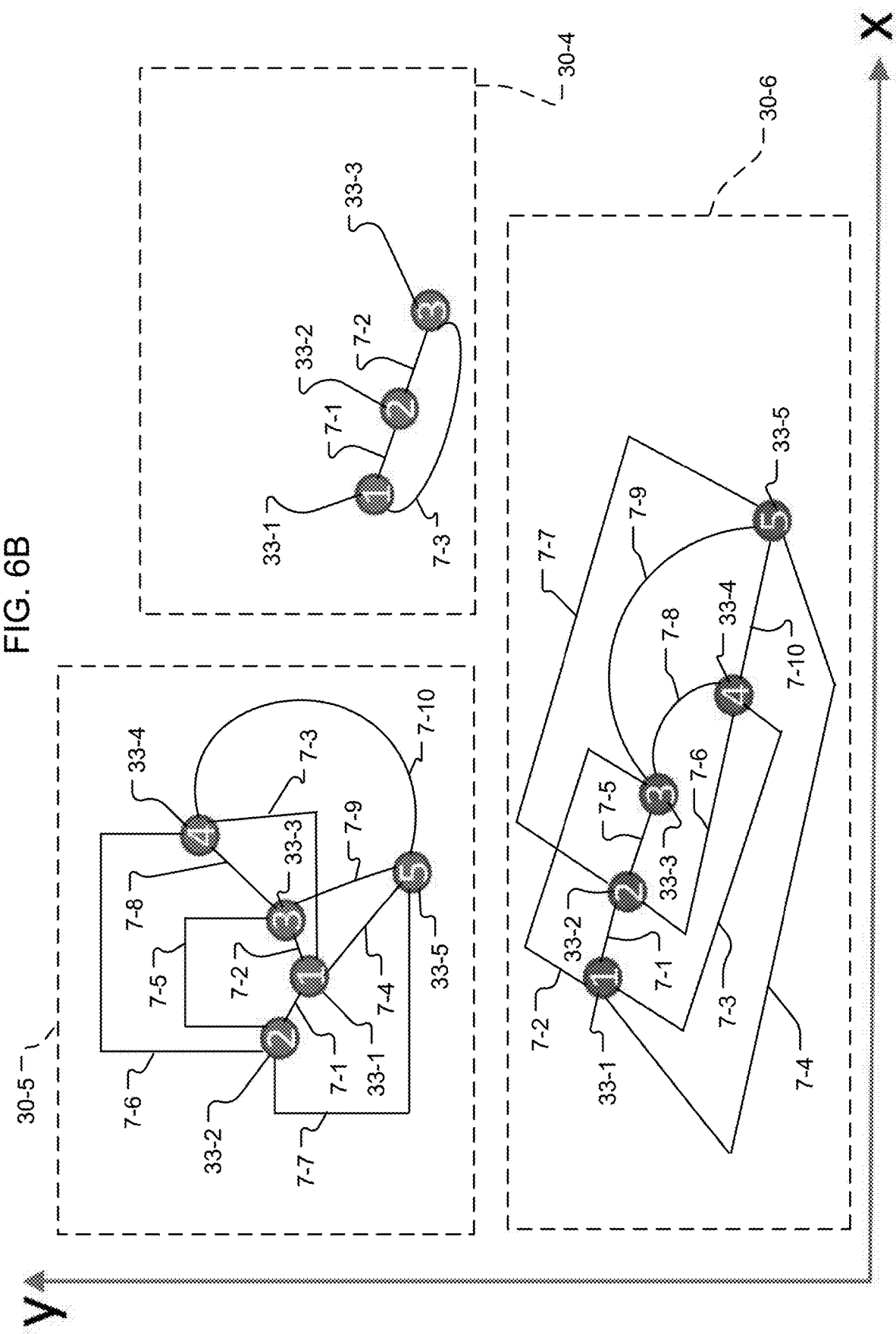

30-5

| Distance vector number | Between position observations | has a value (in pixels) of | is value less than threshold distance value of 12 pixels ? |
|---|---|---|---|
| 7-1 | 33-1 and 33-2 | 3 | yes |
| 7-2 | 33-1 and 33-3 | 2 | yes |
| 7-3 | 33-1 and 33-4 | 14 | --- |
| 7-4 | 33-1 and 33-5 | 13 | --- |
| 7-5 | 33-2 and 33-3 | 8 | yes |
| 7-6 | 33-2 and 33-4 | 16 | --- |
| 7-7 | 33-2 and 33-5 | 14 | --- |
| 7-8 | 33-3 and 33-4 | 8 | yes |
| 7-9 | 33-3 and 33-5 | 8 | yes |
| 7-10 | 33-4 and 33-5 | 14 | --- |

| Distance vector number | Between position observations | has a value (in pixels) of | is value less than threshold distance value of 12 pixels ? |
|---|---|---|---|
| 7-1 | 33-1 and 33-2 | 3 | yes |
| 7-2 | 33-1 and 33-3 | 14 | -- |
| 7-3 | 33-1 and 33-4 | 20 | --- |
| 7-4 | 33-1 and 33-5 | 24 | --- |
| 7-5 | 33-2 and 33-3 | 4 | yes |
| 7-6 | 33-2 and 33-4 | 13 | --- |
| 7-7 | 33-2 and 33-5 | 22 | --- |
| 7-8 | 33-3 and 33-4 | 8 | yes |
| 7-9 | 33-3 and 33-5 | 16 | --- |
| 7-10 | 33-4 and 33-5 | 14 | --- |

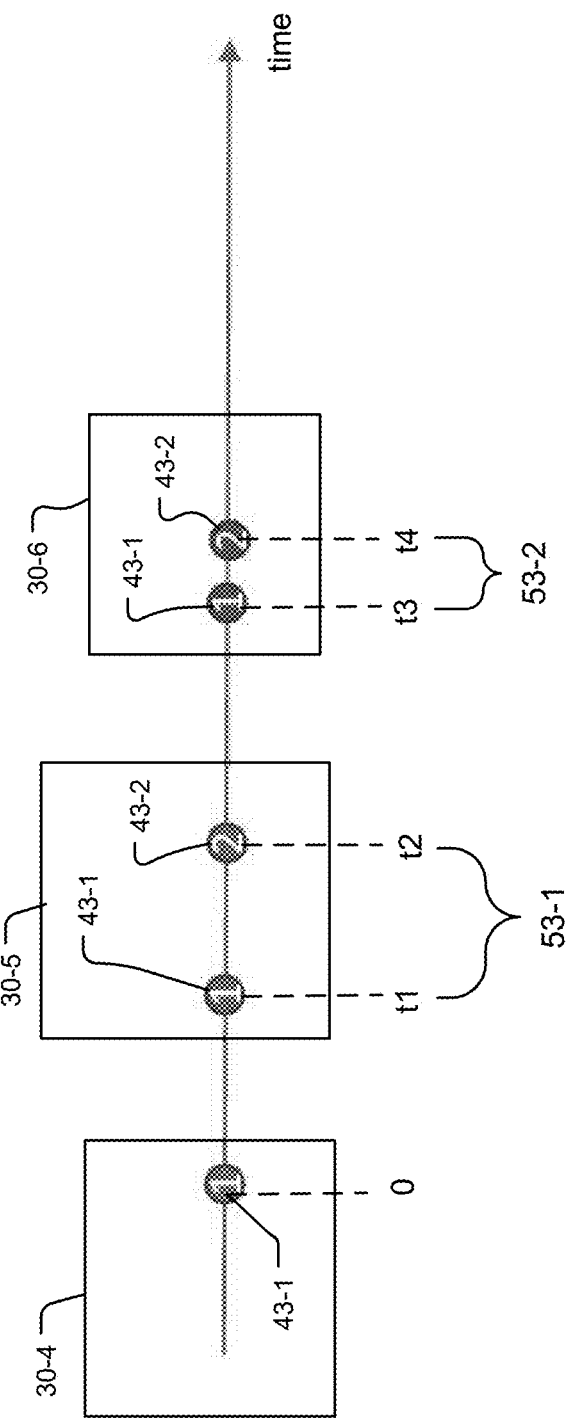

SYSTEM AND METHOD FOR IDENTIFICATION AND SUPPRESSION OF TIME VARYING BACKGROUND OBJECTS

RELATED APPLICATIONS

This application is a Continuation of U.S. patent application Ser. No. 15/873,080, filed on Jan. 17, 2018, which is incorporated herein by reference in its entirety.

BACKGROUND OF THE INVENTION

Surveillance security systems have been traditionally used to help protect people, property, and reduce crime for homeowners and businesses alike and have become an increasingly cost-effective tool to reduce risk. These security systems are used to monitor buildings, lobbies, entries/exits, and secure areas within the buildings, to list a few examples. The security systems also identify illegal activity such as theft or trespassing, in examples.

In these surveillance security systems, surveillance cameras capture image data of scenes. The image data is typically represented as two-dimensional arrays of pixels. The cameras include the image data within streams, and users of the system such as security personnel view the streams on display devices such as video monitors. The image data is also typically stored to a video management system for later access and analysis.

Modern surveillance security systems also often include image analytics systems that analyze the image data for objects of interest and behaviors of interest. These image analytics systems might execute both real-time analysis of image data sent directly from the surveillance cameras, and forensic analysis of stored image data. In many instances, these image analytics systems analyze the image data to detect, identify, and track objects of interest such as individuals and vehicles, and can spot trends and search for specific behaviors of interest. The image analytics systems can also send alert messages to users of the system upon identifying the objects of interest/behaviors of interest.

As part of operation, typical image analytics systems create a background model of the scene, and analyze the image data relative to the background model to identify objects. To create the background model, one or more cameras first capture image data of the scene over a continuous time period, such as five minutes. Then, the image analytics systems create the background model from static portions of the image data and store the background model. The systems then apply pixel-level analysis algorithms to the image data and the background model to identify the objects. Using a foreground segmentation algorithm, for example, the image analytics systems compare the pixels of the image data against that of the background model to determine whether the pixels in the image data are background or foreground pixels. Regions of related foreground pixels are then identified as foreground objects.

The image analytics systems might then track the foreground objects in the image data of the scene over time. Foreground objects of interest include individuals, vehicles, luggage, and goods, in examples. To track the foreground objects, the image analytics systems create bounding boxes for each of the foreground objects. The bounding boxes are notionally superimposed upon the foreground objects within the image data and stored as metadata. The systems track motion of the foreground objects via the bounding boxes, and sent alerts to users/operators in response to identifying and tracking the foreground objects.

SUMMARY OF THE INVENTION

In addition to detecting and tracking foreground objects of interest, existing image analytics systems can also unfortunately track uninteresting objects such as waving flags, running water, clouds, and swaying branches and leaves of trees, in examples. These examples are sometimes referred to as dynamic background, yet the pixels of these uninteresting objects are often classified as foreground pixels by the foreground segmentation algorithms. Correspondingly, the image analytics systems identify foreground objects from these foreground pixels, and then send alerts to users in response. The users must then sort through the alert messages to determine if the alerts were generated in response to foreground objects of interest/behaviors of interest, or in response to uninteresting dynamic background.

A current approach for solving the identification of these uninteresting objects as foreground objects is executed at the pixel level. In this approach, the pixel-level foreground segmentation algorithm is modified such that it will no longer segment (i.e. classify) pixels of uninteresting objects such as trees and waving flags as being foreground pixels.

This pixel-level approach has problems, however. One problem is that some pixels that would ordinarily be classified as foreground pixels are now mistakenly classified as being background pixels. This can cause some foreground objects to have missing pixels/irregular shapes, or some foreground objects to be entirely mischaracterized as being part of the background. Another problem with this approach is that the foreground segmentation algorithm now becomes more computationally expensive.

The proposed system takes a different approach: by addressing the problem at the level of the objects. Specifically, after the foreground segmentation algorithm has completed and objects are created from the foreground pixels, the objects are tracked across the scene via a unique identifier/object ID for each object. The image analytics system then initially classifies all objects as being "dynamic background objects." The classification of an object as a dynamic background object creates a presumption that the object is an uninteresting dynamic background, such as a waving flag or moving tree. Then, based on motion and appearance cues that are available at the object level for each object, the image analytics system determines whether the object should be "promoted" to being an object of interest by reclassifying the object as a foreground object, or should remain classified as a dynamic background object.

Such an approach has advantages. An object which remains classified as a dynamic background object is never shown to the end user. The image analytics system also suppresses generation of alerts for objects classified as dynamic background objects, without affecting identification, tracking, and alert generation associated with foreground objects of interest.

In general, according to one aspect, the invention features a surveillance security system. The surveillance security system comprises at least one surveillance camera generating image data of a scene, and an image analytics system. The image analytics system identifies objects within the image data and analyzes the objects to determine whether the objects are dynamic background objects or foreground objects.

In one example, the image analytics system determines whether the objects are dynamic background objects or foreground objects based upon appearances of each of the objects. The image analytics system typically determines whether the objects are foreground objects based upon appearances of each of the objects by matching color and edge information for each of the objects against that of a background model of the scene.

In another example, the image analytics system determines whether the objects are dynamic background objects or foreground objects based upon movement of each of the objects. The image analytics system initially classifies the objects as dynamic background objects, and reclassifies the dynamic background objects as foreground objects upon determining that the objects are foreground objects. Additionally and/or alternatively, in response to requests from user devices for the objects, the analytics system excludes the dynamic background objects from lists of objects sent in reply messages to the user devices.

Preferably, the image analytics system includes an object tracking system that creates bounding boxes for the objects, the objects including both dynamic background objects and foreground objects.

In one implementation, the image analytics system determines whether the objects are dynamic background objects or foreground objects by tracking positions of the objects within the scene over time and storing position observations for the positions of the objects. Then, for each of the objects, the image analytics system concludes that the objects are dynamic background objects when a count of the position observations has not met a threshold number of position observations.

In another implementation, the image analytics system also determines whether the objects are dynamic background objects or foreground objects by tracking positions of the objects within the scene over time and storing position observations for the positions of the objects. Then, for each of the objects, the image analytics system determines distances between position observations, and concludes whether the objects are dynamic background objects or foreground objects based on the distances.

In one embodiment, the image analytics system is included within the surveillance camera(s).

In yet another implementation, the image analytics system determines whether the objects are foreground objects based upon appearances of each of the objects. This is done by comparing appearance signatures of the objects, which are a way of characterizing the appearances of the objects, relative to a background model of the scene. In one example, the appearance signatures characterize the object color and edge information. Multiple appearance observations are made for each object, where each appearance observation is executed at a different point in time and compares the appearance signature of an object against the background model at the same location as the object. During each appearance observation, the image analytics system measures a match between the appearance signature of each object and a background patch signature from the background model at the same location as each object, and stores a Boolean result of the match and a timestamp as an appearance match result for each of the appearance observations. Then, for each of the objects, the image analytics system compares time intervals between the appearance match results and concludes whether the objects are dynamic background objects or foreground objects based on the time intervals.

In general, according to another aspect, the invention features a method for a surveillance security system. The method comprises at least one surveillance camera generating image data of a scene, and an image analytics system identifying objects within the image data and analyzing the objects to determine whether the objects are dynamic background objects or foreground objects.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 6B is a schematic diagram that illustrates how the method of FIG. 6A analyzes motion of three objects within the image data in FIG. 4, where directed graphs of different position observations for each of the objects are plotted and analyzed;

FIGS. 6C and 6D are tables created by the image analytics system during the analysis of FIG. 6B;

FIG. 7B is a schematic diagram that illustrates how the method of FIG. 7A analyzes an appearance of the same three objects as in FIG. 6B, where directed graphs of different appearance observations for each of the objects are plotted and analyzed.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
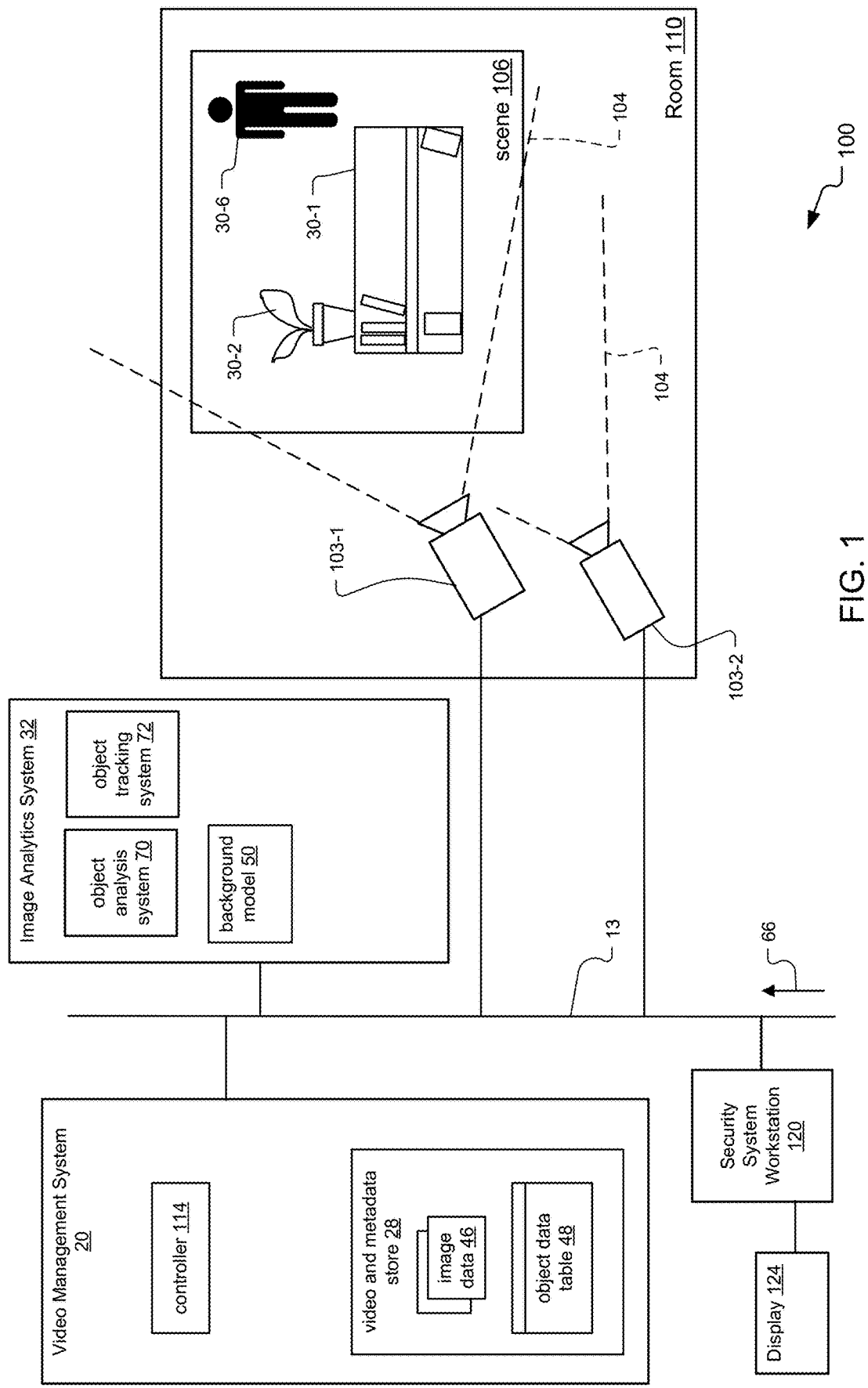
FIG. 1 is a schematic diagram of a surveillance security system to which the invention is applicable.

FIG. 1 shows a surveillance security system 100 that has been constructed according to principles of the present invention.

The surveillance security system 100 comprises one or more surveillance cameras 103-1, 103-2 that generate image data 46 of their respective scenes 106. The surveillance cameras 103-1, 103-2 generate image data 46 of a scene 106, such as room 110 within a building. Exemplary objects 30-1, 30-2, and 30-6 are shown within the scene 106. The objects 30 are within fields of view 104 of the cameras 103.

The system 100 also includes an image analytics system 32. The image analytics system 32 identifies the objects 30 within the image data 46 relative to a background model 50 of the scene 106, created by the image analytics system 32. The image analytics system 32 initially classifies all objects 30 as being dynamic background objects.

The image analytics system 32 identifies objects 30 within the image data 46 and analyzes the objects 30 to determine whether the objects 30 are dynamic background objects or foreground objects. In one example, the image analytics system 32 determines whether the objects are dynamic background objects or foreground objects based upon appearances of each of the objects 30. In another example, the image analytics system 32 determines whether the objects are dynamic background objects or foreground objects based upon movement of each of the objects. In the specific example shown, object 30-1 (stationary bookcase) would typically be part of the background model 50. Moving objects 30 such as object 30-2 (swaying potted plant), or foreground objects such as object 30-6 (an individual), are also shown.

The system 100 also includes a video management system 20 that stores the image data 46 and controls how the image data 46 is provided to the image analytics system 32. The surveillance cameras 103 send the image data 46 over a local network 13 for storing to the video management system 20. The video management system 20 stores the image data 46 to a video and metadata store 28. A controller 114 of the video management system 20 determines whether the image analytics system 32 receives real-time image data 46 from the surveillance cameras 103, or stored image data 46 from the video and metadata store 28, in examples.

The image analytics system 32 includes an object analysis system 70 and an object tracking system 72. The image analytics system 32 receives image data 46 over the network 13. The object tracking system 72 identifies objects 30 within the image data 46, and the object analysis system 70 analyzes the objects to determine whether the objects 30 are dynamic background objects or foreground objects. The image analytics system 32 stores information determined from the tracking and analysis of each of the objects 30 to an object data table 48 within the video and metadata store 28.

Users interact with the system 100 via user devices such as a security system workstation 120. A display 124 such as a video monitor is attached to the workstation 120. Users logged onto the security system workstation 120 issue queries 66 for objects of interest to the video management system 20. The users also receive alerts generated by the image analytics system 32. The image analytics system 32 generates the alerts in response to detecting objects 30 moving within the scene 106. The workstation 120 receives the alerts, and displays the alerts on the display 124 for the users. While not shown, users can also interact with the system 100 via other user devices including personal mobile computing devices such as tablet or smart phone commodity computing devices, in examples.

Figure 2:
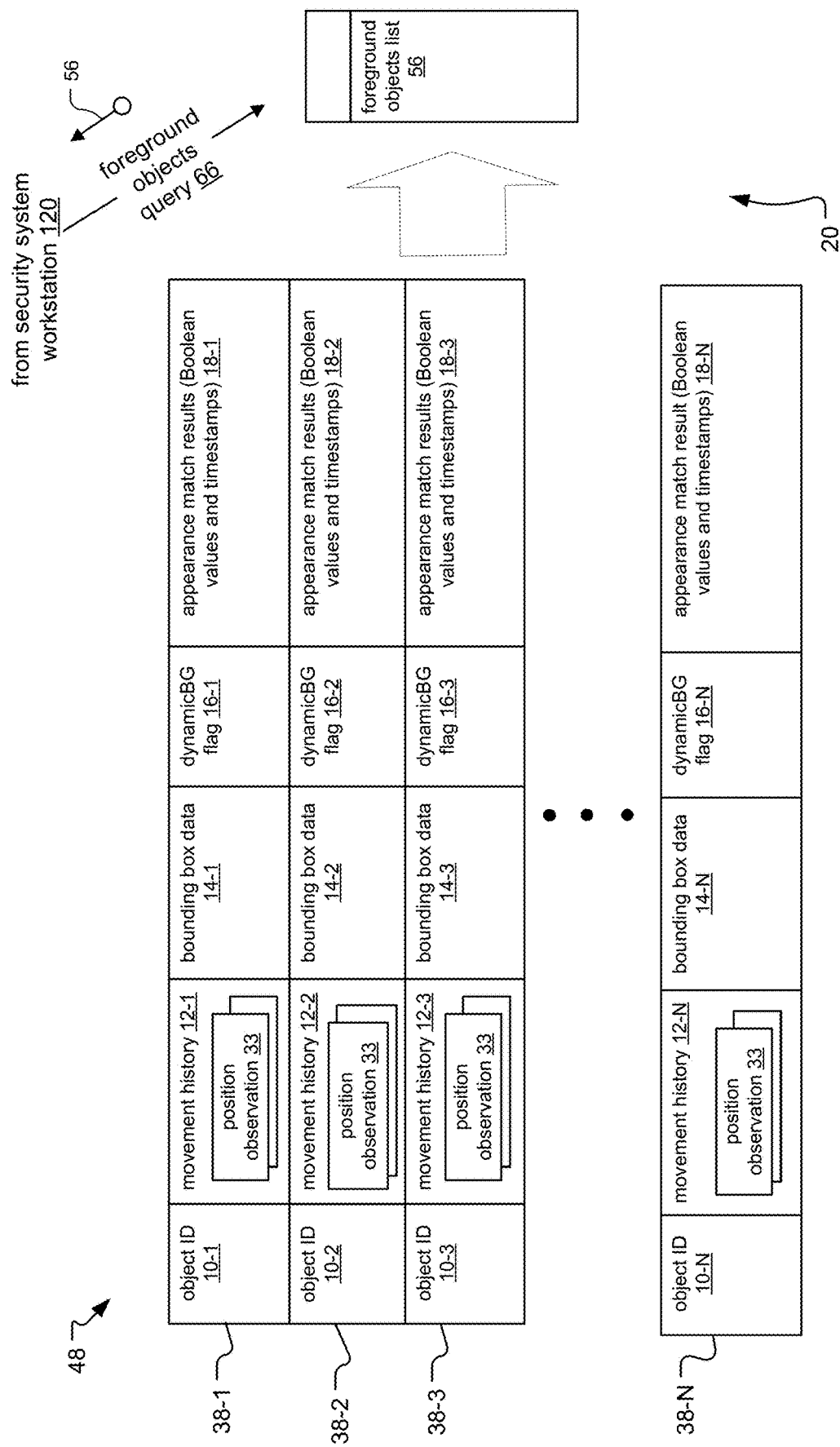
FIG. 2 shows an exemplary implementation of an object data store maintained by the system in FIG. 1, where the object data store maintains information concerning each object identified and tracked by an image analytics system of the surveillance security system.

FIG. 2 shows an exemplary implementation of the object data table 48 for storing information associated with objects 30. The object analysis system 70 determines whether the objects are foreground objects or dynamic background objects, in one example, based upon the object information in the object data table 48 for each of the objects 30. The figure also shows how the video management system 20 creates a foreground objects list 56 from the object data table 48 in response to user queries 66 for objects of interest.

The object tracking system 72 maintains/updates the rows 38 for each object 30 in the object data table 48. The object data table 48 includes information concerning each object 30 identified, tracked, and analyzed by the image analytics system 32. Information for each object 30 is stored within a separate row 38 of the table 48. Rows 38-1 through 38-N are shown. The information stored for each row 38/object 30 includes an object ID 10, movement history 12, bounding box data 14, a dynamicBG flag 16, and appearance match results 18. Each row 38-1 through 38-N respectively includes object IDs 10-1 through 10-N, movement history 12-1 through 12-N, bounding box data 14-1 through 14-N, dynamicBG flag 16-1 through 16-N, and appearance match results 18-1 through 18-N.

More detail for fields within each row 38 is as follows. The movement history 12 for each object 30 includes position observations 33. The appearance match results 18 each include a Boolean value and a timestamp (in seconds). The timestamp indicates the time at which the appearance observation resulting in the appearance match result 18 was executed. The dynamicBG flag 16 is a Boolean value that indicates whether the object 30 is a dynamic background object or a foreground object.

The video management system 20 and image analytics system 32 also execute operations based upon the value of the dynamicBG flag 16 for each object 30. In one example, when the value of the dynamicBG flag 16 is set to TRUE, the object analysis system 70 does not generate alert messages for that object 30. In another example, when an end user on workstation 120 issues queries 66 for objects of interest, the video management system 20 builds a response message that includes only those objects 30 having a dynamicBG flag 16 value of FALSE. This indicates that the object 30 is a foreground object. The objects 30 having the dynamicBG flag 16 value of FALSE are added to the foreground objects list 56, and the video management system 20 then includes the foreground objects list 56 in the response message sent to the user.

Figure 3:
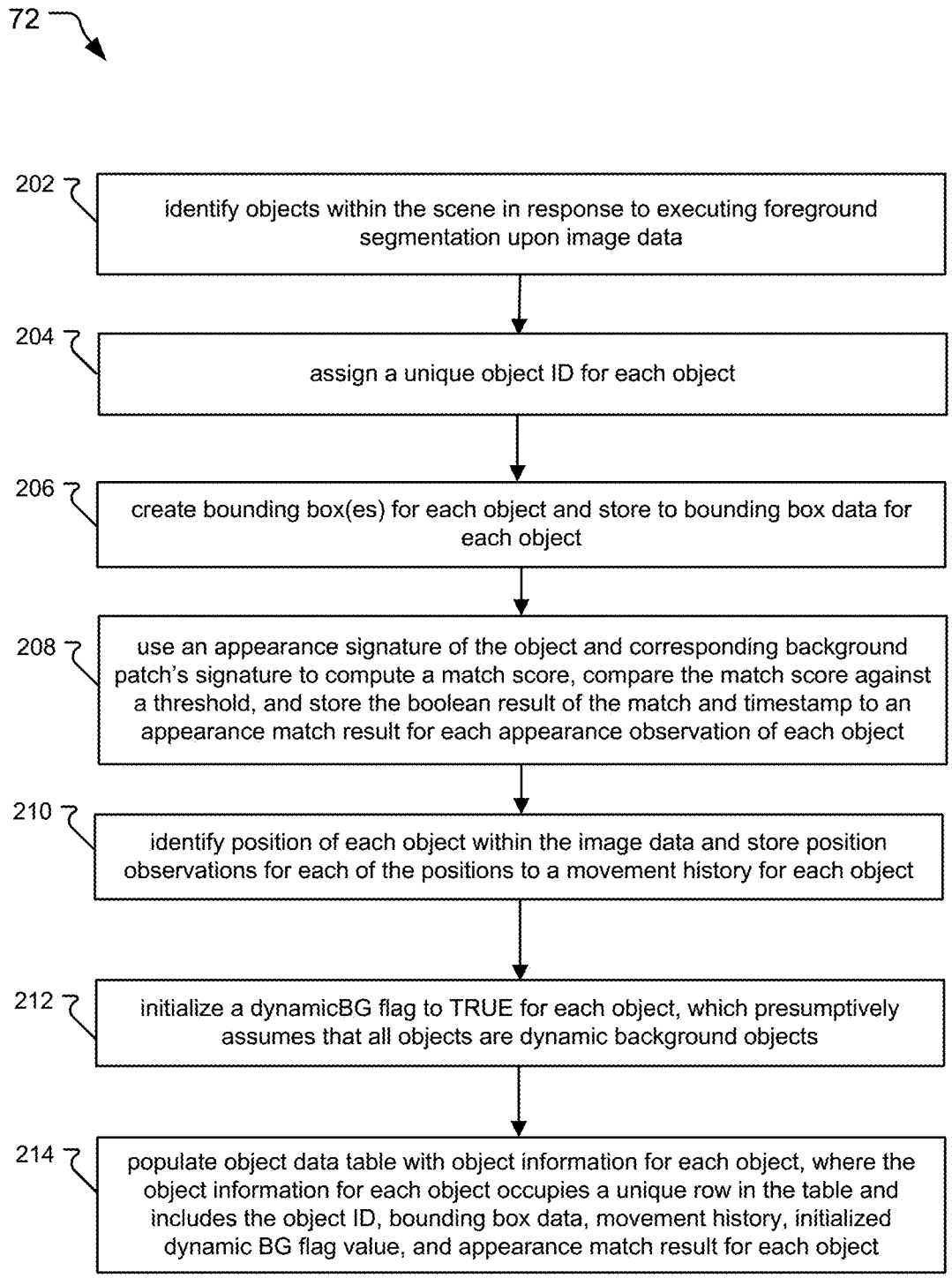
FIG. 3 is a flow chart that describes a method of the image analytics system that identifies and tracks objects moving in the image data, and presumes that all objects are dynamic background objects.

FIG. 3 is a flow chart that describes a method of the object tracking system 72 of the image analytics system 32. The method provides more detail for how the object tracking system 72 identifies objects 30, determines the object information for each of the objects 30 and populates the object data table 48 in response.

In step 202, the object tracking system 72 identifies objects 30 within the scene 106 in response to executing foreground segmentation upon the image data 46. According to step 204, the object tracking system 72 assigns a unique object ID 10 for each object 30. In step 206, the object tracking system 72 creates bounding boxes for each object 30 and stores the bounding boxes to bounding box data 14.

Then, in step 208, the object tracking system 72 uses an appearance signature of each object and corresponding background patch's signature to compute a match score, compares the match score against a threshold, and stores the Boolean result of the match and a timestamp to an appearance match result 18 for each appearance observation of each object 30. In this way, multiple appearance match results 18 are stored for each object 30, where an appearance match result 18 is stored for each appearance observation 43 of each object 30.

In step 210, the object tracking system 72 identifies positions of each object within the image data 46 and stores position observations 33 for each of the positions to a movement history 12 record for each object 30. According to step 212, the object tracking system 72 initializes a dynamicBG flag 16 to TRUE for each object 30, which presumptively assumes that all objects are dynamic background objects. In this way, the image analytics system 72 initially classifies all objects as dynamic background objects.

Then, in step 214, the object tracking system 72 populates the object data table 48 with object information for each object 30. The object information for each object 30 occupies a unique row 38 in the table 48 and includes the object ID 10, bounding box data 14, movement history 12, dynamicBG flag 16 and appearance match results 18 for each object 30.

Figure 4:
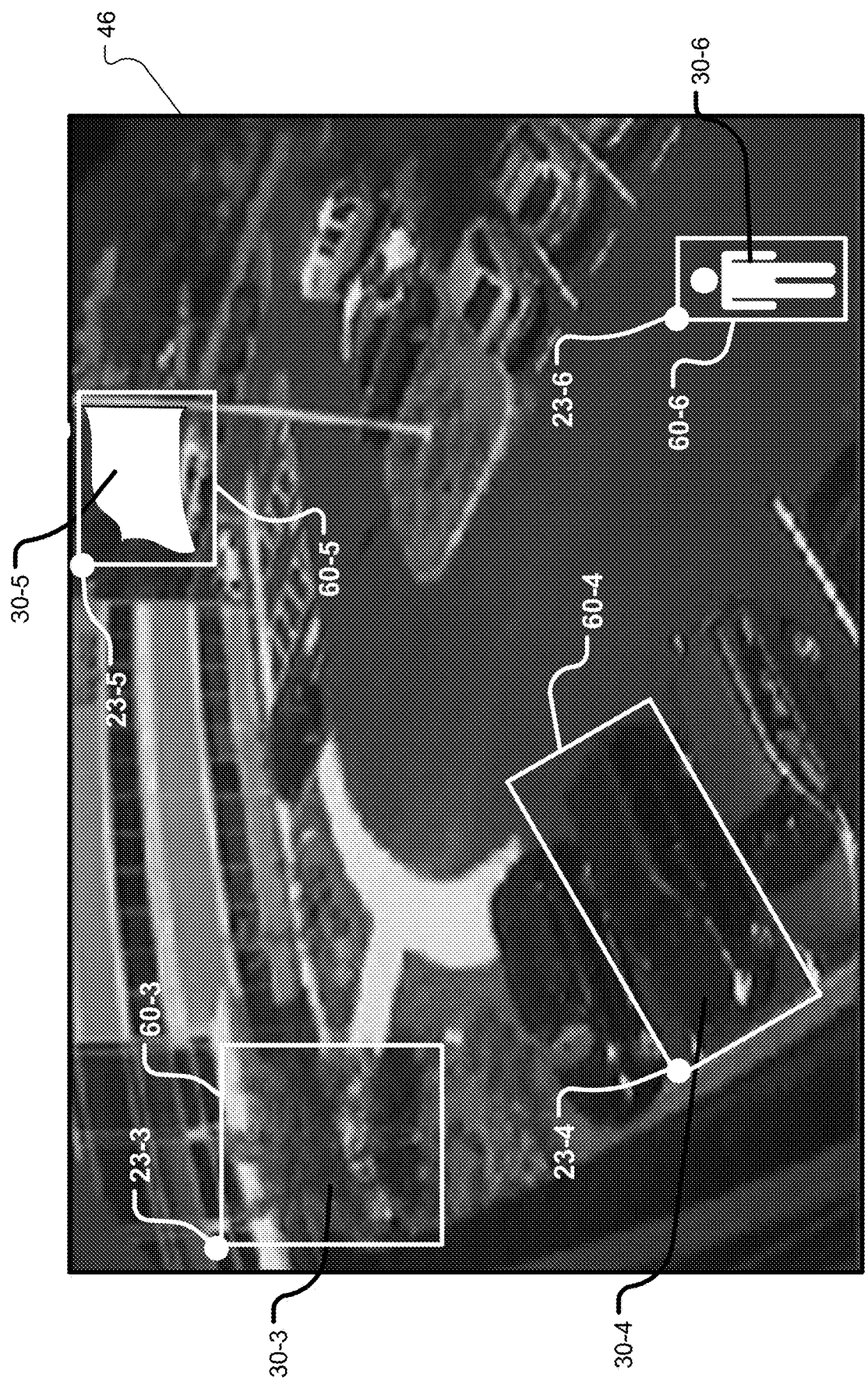
FIG. 4 is an exemplary instance of image data of a scene captured by a surveillance camera of the surveillance security system, where four exemplary objects within the image data are shown.

FIG. 4 is an exemplary instance of image data 46 of an outdoor scene 106 captured by surveillance camera 103-1. Four exemplary objects 30-3 through 30-6 identified by the object tracking system 72 are shown.

The object tracking system 72 creates bounding boxes 60 for all objects 30, including foreground objects and dynamic background objects. The object tracking system 72 uses the bounding boxes 60 to track the objects 30 as they move across the scene 106. The bounding boxes 60 are shown superimposed upon the image data 46. Bounding boxes 60-3 through 60-6 for objects 30-3 through 30-6, respectively, are shown.

In more detail, bounding box 60-3 is created for object 30-3 (a tree); bounding box 60-4 is created for object 30-4 (a stationary car); bounding box 60-5 is created for object 30-5 (a flag); and bounding box 60-6 is created for object 30-6 (a foreground object, namely an individual moving within the scene 106).

In one implementation, object tracking system 72 tracks objects and determines position observations 33 for the objects using anchor points 23. Anchor points 23 define an origin for each of the bounding boxes 60. Bounding boxes 60-3 through 60-6 have anchor points 23-3 through 23-6, respectively. In one example, the object tracking system 72 determines the positions for each of the objects 30 using the anchor points 23, relative to the image data 46 and/or background model 50 of the scene 106.

The image analytics system 32 tracks positions of the objects 30 within the scene over time using the bounding box data 14 for the object, and stores the positions as position observations 33. Each position observation 33 includes a location/position of each object 30 within the image data 46 and a timestamp indicating when the position observation 33 was obtained. In one implementation, the location/position within each position observation 33 is the location of the anchor point 23 for the object 30, relative to X-Y pixel coordinates of the image data 46. Each position observation 33 is then stored to the movement history 12 field for the object 30.

Figure 5:
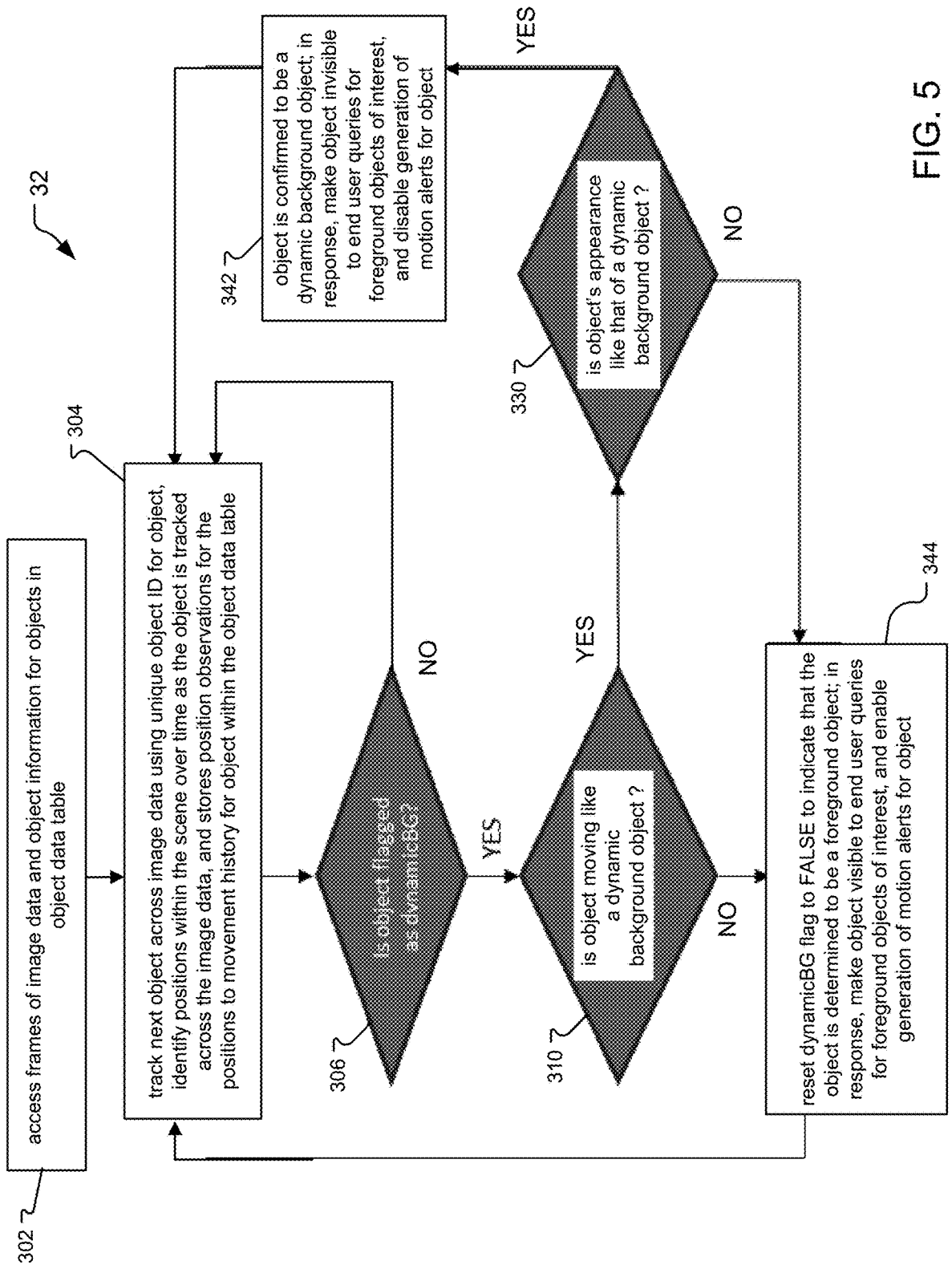
FIG. 5 is a flow chart that describes a method of the image analytics system for determining whether objects are foreground or dynamic background objects.

FIG. 5 is a flow chart that describes a method of the image analytics system 32 for determining whether objects are foreground objects or dynamic background objects. The image analytics system 32 determines whether objects are foreground objects or dynamic background objects based on motion of the objects and/or an appearance of the objects 30.

In step 302, the image analytics system 32 accesses frames of image data 46 and object information for objects 30 in the object data table 48. In step 304, the image analytics system 32 tracks the next object 30 across the image data 46 using unique the object ID 10 for the object 30. According to step 306, the image analytics system 32 identifies positions of the objects within the scene 106 over time as the object is tracked across the image data 46, and stores position observations 33 for the positions to movement history 12 for each object 30 within the object data table 48.

In step 305, the image analytics system 32 checks the dynamicBG flag 16 to determine whether the object 30 is classified as a dynamic background object. If the value of dynamicBG flag 16 is TRUE, which indicates that the object 30 is classified as a dynamic background object, the method transitions to step 310. Otherwise, the method transitions back to step 304.

According to step 310, the image analytics system 32 determines whether the motion of each object 30 is like that of a dynamic background object. If the object is moving like a dynamic background object, the method transitions to step 330. Otherwise, the method transitions to step 344.

In step 330, the image analytics system 32 determines whether the appearance of each object 30 is like that of a dynamic background object. If the object's appearance is determined to be like that that of a dynamic background object, the method transitions to step 342. Otherwise, the method transitions to step 344.

According to step 342, the object is confirmed to be a dynamic background object. In response, the image analytics system 32 makes the object "invisible" to end user queries for objects of interest, and disables/suppresses generation of motion alerts for the object 30. In one implementation, the image analytics system 32 makes the object "invisible" to end user queries 66 for objects of interest by excluding dynamic background objects from lists of objects 56 sent in reply messages to the user devices.

The method reaches step 344 when the image analytics system 32 has determined that the object is a foreground object, based on the motion and/or appearance of the object. In step 344, the image analytics system 32 resets the dynamicBG flag 16 to FALSE to indicate that the object is a foreground object. The object has been "promoted" to being classified as a foreground object. In response, the image analytics system 32 makes the object 30 visible to end user queries 66 for foreground objects of interest, and enables generation of motion alerts for the object 30. In this way, after initially classifying all objects 30 as dynamic background objects, the image analytics system 32 reclassifies the dynamic background objects as foreground objects upon determining that the objects are foreground objects.

Figure 6A:
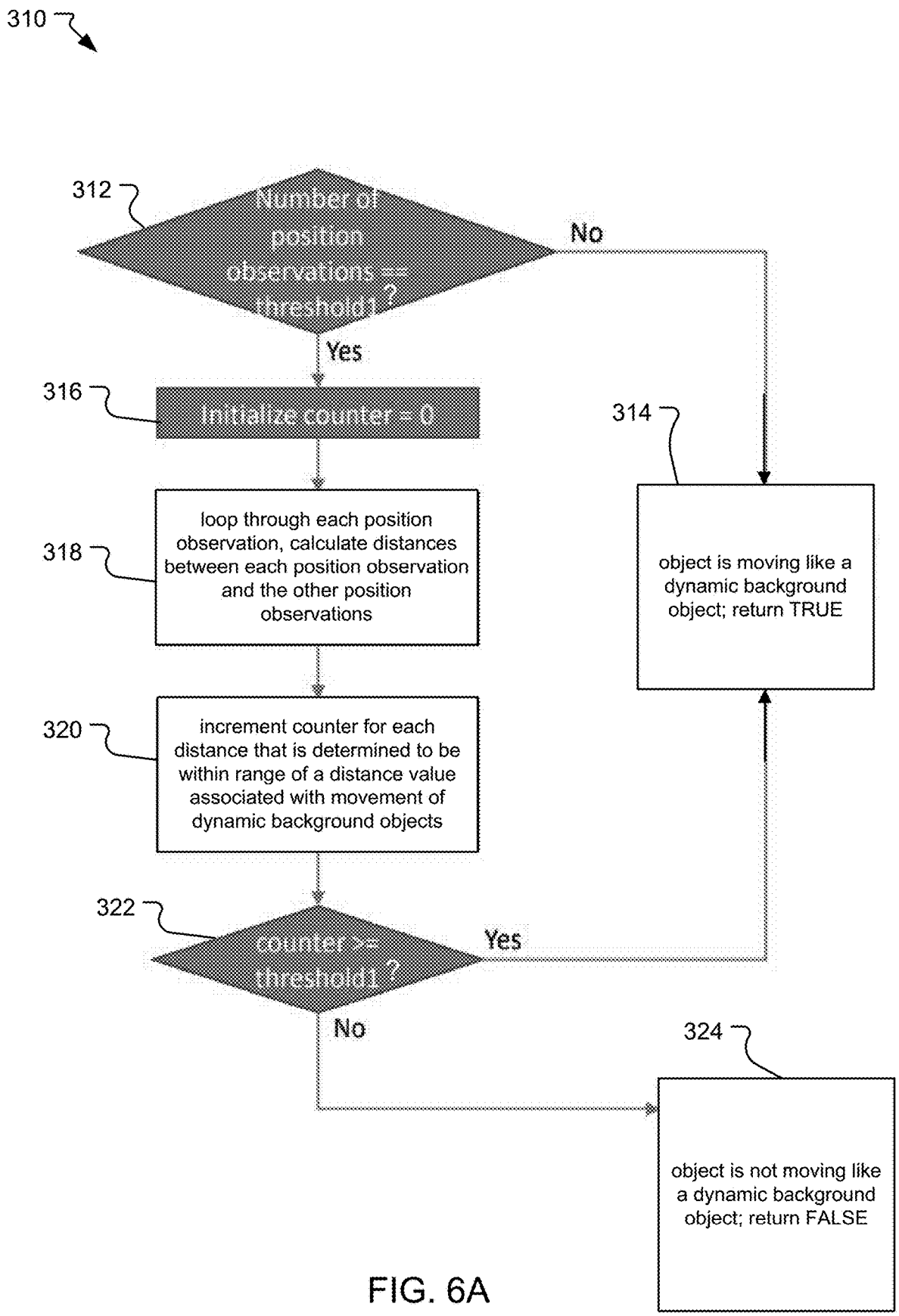
FIG. 6A is a flow chart that provides more detail for the method of FIG. 5, where FIG. 6A describes how the image analytics system determines whether objects are foreground or dynamic background objects based upon motion of the objects.

FIG. 6A is a method that provides more detail for step 310 of FIG. 5. Specifically, the method of FIG. 6A determines whether an object 30 within the scene 106 is a dynamic background object or a foreground object, based upon motion of the object.

The image analytics system 32 determines whether the objects are dynamic background objects or foreground objects by tracking positions of the objects within the scene over time and storing position observations 33 for the positions of the objects 30. Then, for each of the objects, the image analytics system 32 determines distances between the position observations 33 and concludes whether the objects 30 are dynamic background objects or foreground objects based on the distances.

Uninteresting objects and foreground objects of interest typically move in different ways. The movement of uninteresting objects such as waving flags, leaves and branches of trees is often confined to the same small area or region of the scene 106. Foreground objects, in contrast, typically move more frequently within scenes, and the movement usually spans a larger area or region across the scene 106 over time. Vehicles, for example, often enter a scene 106, move across the scene, and then exit the scene 106.

In step 312, the image analytics system 32 accesses the motion history 12 for the object 30 and determines whether the number of position observations 33 has met a first threshold value (indicated as "threshold1" in FIG. 6A). The threshold value indicates a minimum number of position observations 33 required to overcome the presumption that the object 30 is a dynamic background object. As a result, in one example, the image analytics system 32 concludes that the objects are dynamic background objects when a count of the position observations 33 has not met a threshold number of position observations 33.

When the number of position observations 33 is less than threshold1, the method transitions to step 314 to indicate that the object is moving like a dynamic background object, and therefore has been confirmed to be a dynamic background object. Otherwise, the method transitions to step 316. The method reaches step 316 when the number of position observations 33 has at least met the minimum number of position observations 33 indicated by threshold1. The method then initializes a counter for use in subsequent processing.

In step 318, the method loops through each position observation 33, and calculates a distance vector between each position observation 33 and each of the other position observations 33. A distance vector is the shortest distance between two position observations 33, typically represented as a number of pixels between the position observations 33.

According to step 320, the method compares the distance vectors for the object 30 to a threshold (i.e. maximum) distance value, in pixels, associated with movement of dynamic background objects. The method increments the value of the counter, for each distance vector that is determined to be less than the threshold distance value. As the counter value increases for an object 30, that object 30 is more likely to remain classified as a dynamic background object.

In step 322, the value of the counter for the object 30 is then compared to the "threshold1" value. If the value of the counter is greater than or equal to threshold1, the method transitions to step 314 to indicate that the object has been confirmed to be a dynamic background object. Otherwise, the method transitions to step 324.

According to step 314, the motion of the object 30 is determined to be like that of a dynamic background object. The method returns TRUE to the caller (step 310 in the method of FIG. 5) in response. In a similar vein, in step 324, the motion of the object 30 is determined to be unlike that of a dynamic background object (i.e. the motion of the object 30 is similar to that of a foreground object). The method returns FALSE in response.

FIG. 6B is a schematic diagram that illustrates operation of the method of FIG. 6A for analyzing motion of exemplary objects 30-4, 30-5, and 30-6 in FIG. 4.

In more detail, FIG. 6B has three directed graphs. Each of the directed graphs represent movement for objects 30-4, 30-5, and 30-6 in the image data of FIG. 4. The directed graphs include the position observations 33 for each of the objects 30, obtained from the object data table 48. The position observations 33 for each of the objects 30 are plotted along an X-Y axis.

In accordance with the method of FIG. 6A, distances/distance vectors 7 between each position observation 33 and the other position observations 33 are calculated. The image analytics system 32 determines whether the objects 30 are dynamic background objects or foreground objects based upon the total number of position observations 33, and based upon the distances (e.g. distance vectors) between each of the position observations 33 over time.

In each of the examples, the following thresholds are defined. The minimum number of position observations 33 required to overcome the presumption that the object is a dynamic background object, or "threshold1," is five. The threshold distance value for the distance vectors 7 is 12 pixels.

In one example, object 30-4 (stationary car) has three position observations 33-1 through 33-3. Distance vectors 7-1 through 7-3 are also shown. Distance vector 7-1 is between position observations 33-1 and 33-2, distance vector 7-2 is between position observations 33-2 and 33-3, and distance vector 7-3 is between position observations 33-1 and 33-3.

However, the number of position observations for object 30-4 is less than the minimum number of position observations 33 required to overcome the presumption that object 30-4 is a dynamic background object. Specifically, object 30-4 has three position observations 33-1 through 33-3, which is less than the "threshold1" value of five. Thus, the method of FIG. 6A confirms that object 30-4 is a dynamic background object.

In another example, object 30-5 (waving flag) has five position observations 33-1 through 33-5. Distance vectors 7-1 through 7-10 are also shown. Because the number of position observations (33-1 through 33-5, for a total of five observations) meets the "threshold1" value of five, the method of FIG. 6A additionally traverses steps 316-322 to compare the values of distance vectors 7-1 through 7-10 against the threshold distance value.

FIG. 6C further illustrates distance vectors 7-1 through 7-10 for the position observations 33 of object 30-5 in FIG. 6B. More information for the distance vectors 7 and related position observations 33 is provided in table 80-1.

Table 80-1 includes a listing of distance vectors 7 between each pair of position observations 33, the value of each distance vector 7 in pixels, and a determination as to whether the value of each distance vector 7 is less than the threshold distance value of 12 pixels. In accordance with the method of FIG. 6A, when the value of a distance vector 7 for object 30-5 is less than the threshold distance value, the image analysis system 32 increments a counter.

With reference to table 80-1 for object 30-5, five distance vectors 7-1, 7-2, 7-5, 7-8, and 7-9 are counted as having values which are less than the threshold distance value. Because this count is equal to or greater than the value of "threshold1," object 30-5 is confirmed to be a dynamic background object.

Returning to FIG. 6B, in yet another example, object 30-6 (an individual) has five position observations 33-1 through 33-5. Distance vectors 7-1 through 7-10 are also shown. Because the number of position observations (33-1 through 33-5, for a total of five observations) meets the "threshold1" value of five, the method of FIG. 6A additionally traverses steps 316-322 to compare the values of distance vectors 7-1 through 7-10 against the threshold distance value.

FIG. 6D further illustrates distance vectors 7-1 through 7-10 for the position observations 33 of object 30-6 in FIG. 6B. More information for distance vectors 7 and related position observations 33 is provided in table 80-2.

Table 80-2 includes a listing of distance vectors 7 between each pair of position observations 33, the value of each distance vector 7, and a determination as to whether the value of each distance vector 7 is less than the threshold distance value. With reference to table 80-2 for object 30-6, three distance vectors 7-1, 7-5, and 7-8 are counted as having values which are less than the threshold distance value. Because this count is less than the value of "threshold1," object 30-6 is confirmed to be a foreground object.

Figure 7A:
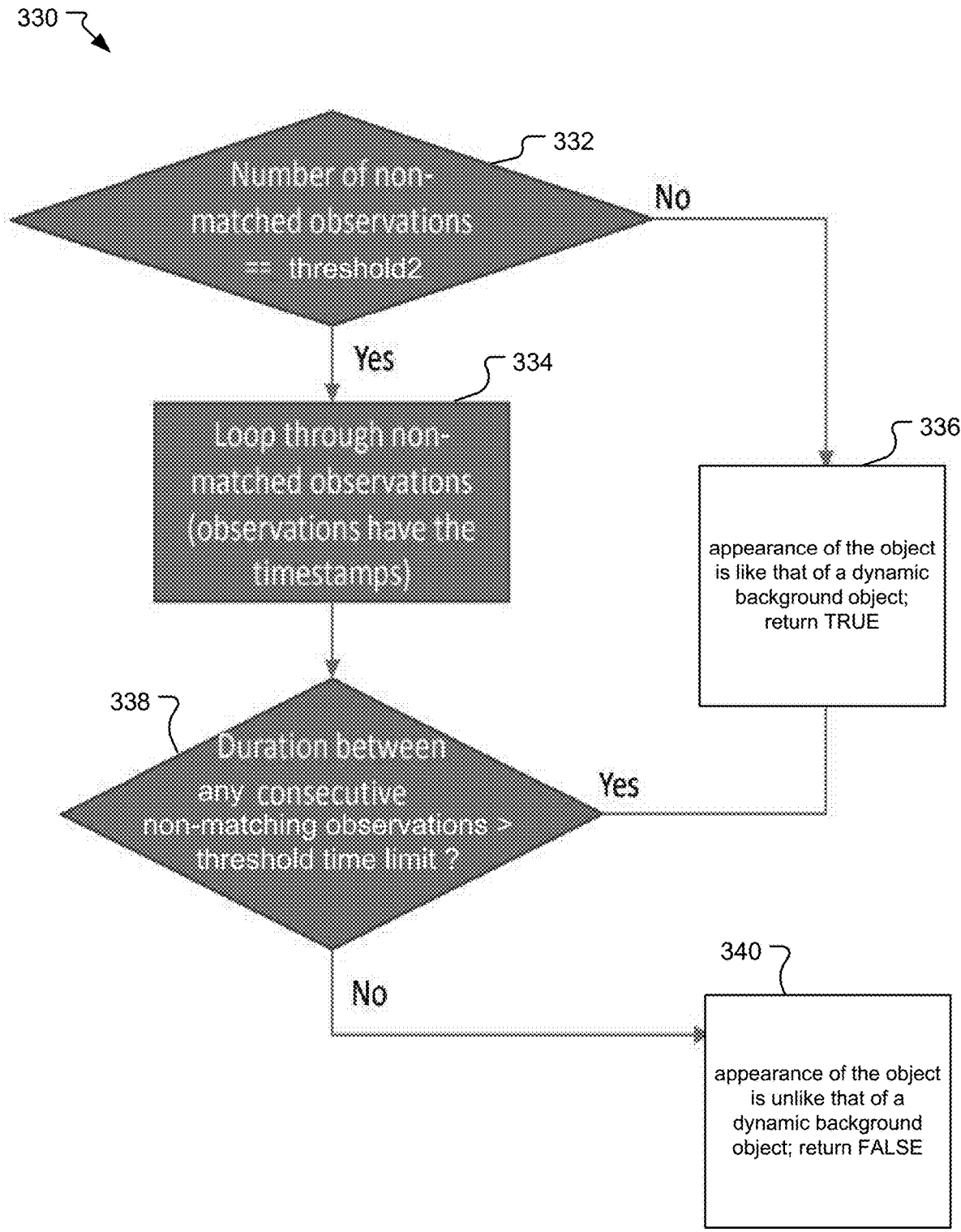
FIG. 7A is a flow chart that provides more detail for the method of FIG. 5, where the flow chart of FIG. 7A describes how the image analytics system determines whether objects are foreground or dynamic background objects, based upon appearances of the objects.

FIG. 7A is a method that provides more detail for step 330 of FIG. 5. In FIG. 7A, the image analytics system 32 determines whether the objects are dynamic background objects or foreground objects based upon appearances of the objects 30.

In one implementation, the image analytics system 32 determines whether the objects are foreground objects based upon appearances of each of the objects by making appearance observations 43 for each object 30. For each appearance observation 43, the image analytics system 32 first compares an appearance signature of the objects 30 relative to the background model and specifically a patch of the scene 50, and calculates and stores an appearance match result 18. Each appearance match result 18 includes a Boolean value that indicates the result of the match and also includes a timestamp indicating when the appearance match result 18 was obtained. Then, for each of the objects 30, the image analytics system 32 compares time intervals between the appearance match results 18, and concludes whether the objects are dynamic background objects or foreground objects based on the time intervals.

In another example, the image analytics system determines whether the objects are foreground objects based upon appearances of each of the objects by matching color and edge information 44 for each of the objects 30 against that of the background model 50 of the scene 106. If a number of appearance observations 43 within a specified time period indicates that the appearance of the object 30 is not similar enough to the background model 50, the object is determined to be a foreground object, for example.

In step 332, the image analytics system 32 accesses the appearance match results 18 for the object 30 and determines a number of non-matching appearance observations 43 between the object and the background model 50. A non-matching appearance observation 43 is associated with an appearance match result 18 having a Boolean value of FALSE. In one example, appearance observations 43 of a non-matching nature include observations 43 in which colors and/or intensities of object pixels differ from that of the background model 50. In another example, appearance observations 43 of a non-matching nature include observations 43 in which edge information of objects do not align with edge information in the background model 50.

As the number of non-matching appearance observations 43 increases for an object 30, the likelihood that the object 30 is a foreground object increases. Specifically, when the number of non-matching appearance observations 43 is at least equal to a non-match threshold ("threshold2" in FIG. 7A), this overcomes the presumption that the object is a dynamic background object (and thus the object is a foreground object). When the number of non-matches is less than threshold2, however, the method transitions to step 336 to indicate that the appearance of the object is like that of a dynamic background object.

In step 334, the method loops through the non-matching appearance observations 43, each of which has a timestamp indicating the time in which the observation was made. The image analytics system 32 also calculates a time duration between consecutive appearance observations 43 for each object 30.

Then, in step 338, the image analytics system 32 determines whether the time duration between any consecutive non-matching appearance observations 43 is greater than a threshold time limit. If the time duration is greater than the threshold time limit, the method transitions to step 336 to indicate that the appearance of the object is like that of a dynamic background object. The method then returns TRUE. Otherwise, the method transitions to step 340 to indicate that the appearance of the object is unlike that of a dynamic background object (i.e. is similar in appearance to a foreground object), and the method returns FALSE.

FIG. 7B is a schematic diagram that illustrates operation of the method of FIG. 7A for analyzing an appearance of objects 30-4, 30-5, and 30-6 in FIG. 4.

In more detail, FIG. 7B has three directed graphs. Each of the directed graphs represent appearance observations 43 of objects 30-4, 30-5, and 30-6 in the image data of FIG. 4. The directed graphs include non-matching appearance observations 43 for each of the objects, obtained from the object data table 48. In accordance with the method of FIG. 7A, time durations 53 between consecutive appearance observations are calculated. The image analytics system 32 then counts the number of non-matching appearance observations 43, and determines whether the objects are dynamic background objects or foreground objects based upon the time durations 53 between consecutive non-matching appearance observations 43.

In each of the examples, the following thresholds are defined. A minimum number of non-matching appearance observations, or "threshold2," is two. The threshold time limit between any consecutive non-matching appearance observations 43 is about 2 seconds.

In one example, object 30-4 (stationary car) has only one non-matching appearance observation 43-1. Because the number of non-matching appearance observations 43 is less than the "threshold2" value of two, the image analytics system 32 concludes that the object is a dynamic background object.

In another example, object 30-5 (waving flag) has two non-matching appearance observations 43-1 and 43-2. Because the number of non-matching appearance observations 43 meets the threshold2 value of two, the image analytics system 32 must further compare the time duration 53-1 between non-matching appearance observations 43-1 and 43-2 against the threshold time limit.

Here, the timestamp of non-matching appearance observation 43-2, at position t2, is 600 seconds since startup of the image analytics system 32. The timestamp of non-matching appearance observation 43-1, at position t1, is 593 seconds. As a result, the value of time duration 53-1 is 7 seconds. Because the time duration 53-1 between consecutive non-matching appearance observations 43-1 and 43-2 is greater than the threshold time limit, the image analytics system 32 concludes that object 30-5 is a dynamic background object.

In yet another example, object 30-6 (an individual) has two non-matching appearance observations 43-1 and 43-2, which meets the "threshold2" value. As a result, the image analytics system 32 must further compare the time duration 53-2 between non-matching appearance observations 43-1 and 43-2 against the threshold time limit.

Here, the timestamp of non-matching appearance observation 43-2, at position t4, is 620 seconds. The timestamp of non-matching appearance observation 43-1, at position t3, is 619.5 seconds. As a result, the value of time duration 53-2 is 0.5 seconds. Because the time duration 53-2 between consecutive non-matching appearance observations 43-1 and 43-2 is less than the threshold time limit, the image analytics system 32 concludes that object 30-6 is a foreground object.

Figure 8:
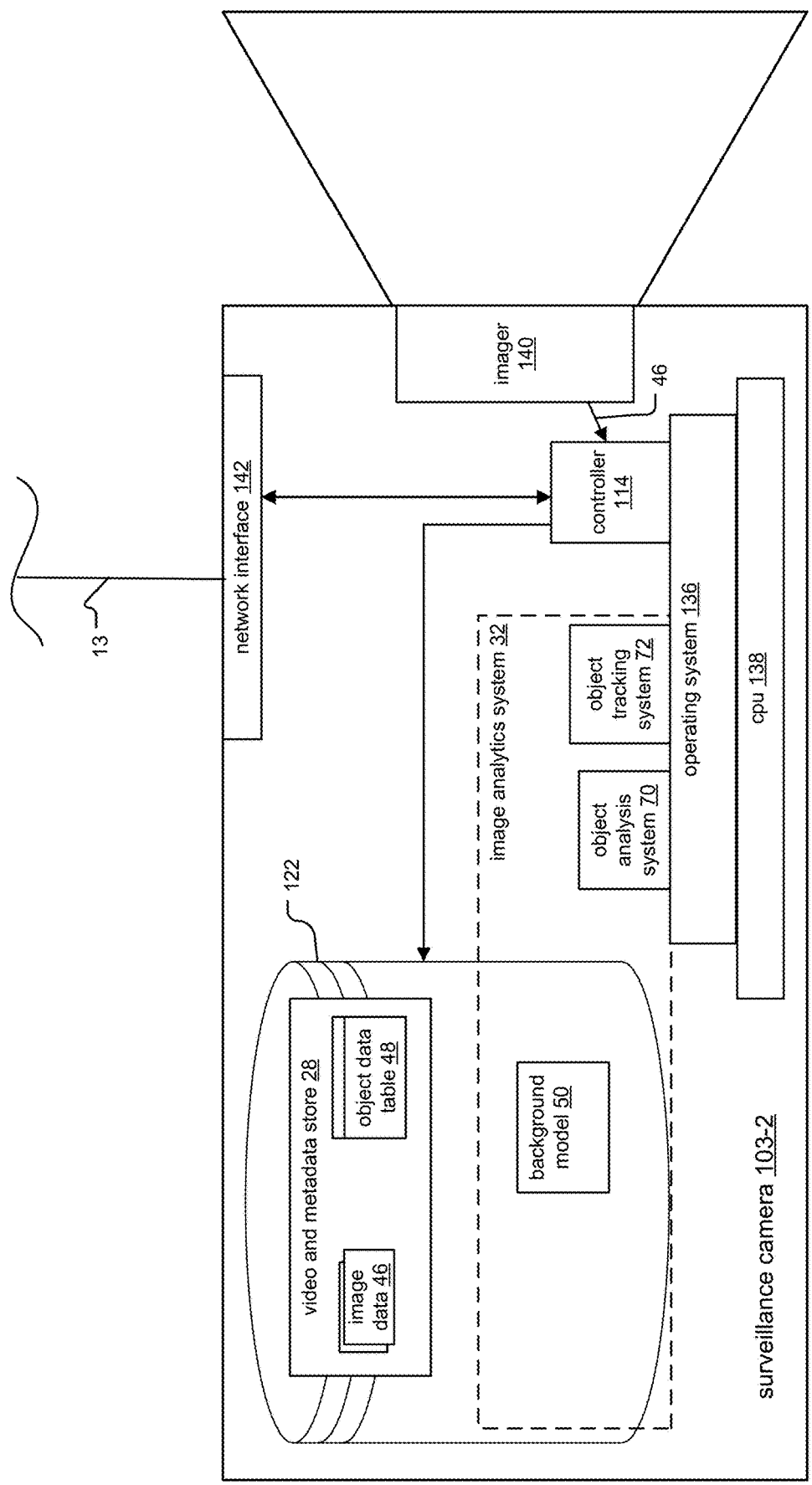
FIG. 8 shows an embodiment of a surveillance camera within the system of FIG. 1, where the image analytics system is integrated within the surveillance camera.

FIG. 8 shows an embodiment of surveillance camera 103-2 within the surveillance security system 100 of FIG. 1.

Unlike the system of FIG. 1, the image analytics system 32 is included within the surveillance camera 103-2. The image analytics system 32 includes the object analysis system 70, the object tracking system 72, and the background model 50 as in FIG. 1. However, these components take different forms when included/integrated within the surveillance camera 103-2.

Specifically, in one implementation, the object analysis system 70 and the object tracking system 72 are software modules that execute upon an operating system 136 of the camera 103-2. The background model 50 is stored to a local database 122 of the camera 103-2. The operating system 136, in turn, is on top of a central processing unit (CPU) 138 of the camera 103-2.

The surveillance camera 103-2 also includes an imager 140, a controller 114, and a video and metadata store 28. In the illustrated example, the controller 114 is a software module that executes upon the operating system 136. The controller 114 receives image data 46 captured by the imager 140, stores the image data 46 to the video and metadata store 28, and provides image data 46 (either real-time from the imager 140 or stored image data 46) to the image analytics system 32 for analysis. The controller 114 also communicates over network 13 via network interface 142.

While this invention has been particularly shown and described with references to preferred embodiments thereof, it will be understood by those skilled in the art that various changes in form and details may be made therein without departing from the scope of the invention encompassed by the appended claims.

What is claimed is:

1. A surveillance security system, comprising:
   a plurality of surveillance cameras for generating image data of a scene; and
   an image analytics system comprising an object tracking system for identifying objects within the image data and an object analysis system for analyzing the objects to determine whether the objects are dynamic background objects or foreground objects based upon appearances of each of the objects by matching color and edge information for each of the objects against that of static portions of the scene.

2. The system of claim 1, wherein the image analytics system determines whether the objects are dynamic background objects or foreground objects based upon movement of each of the objects.

3. The system of claim 1, wherein the image analytics system initially classifies the objects as dynamic background objects, and reclassifies the dynamic background objects as foreground objects upon determining that the objects are foreground objects.

4. The system of claim 1, wherein in response to requests from user devices for the objects, the analytics system excludes the dynamic background objects from lists of objects sent in reply messages to the user devices.

5. The system of claim 1, wherein the image analytics system includes an object tracking system that creates bounding boxes for the objects, the objects including both dynamic background objects and foreground objects.

6. The system of claim 1, wherein the image analytics system determines whether the objects are dynamic background objects or foreground objects by:
   tracking positions of the objects within the scene over time and storing position observations for the positions of the objects; and
   for each of the objects, concluding that the objects are dynamic background objects when a count of the position observations has not met a threshold number of position observations.

7. The system of claim 1, wherein the image analytics system determines whether the objects are dynamic background objects or foreground objects by:
   tracking positions of the objects within the scene over time and storing position observations for the positions of the objects; and
   for each of the objects, determining distances between position observations and concluding whether the objects are dynamic background objects or foreground objects based on the distances.

8. The system of claim 1, wherein the image analytics system is included within the plurality of surveillance cameras.

9. The system of claim 1, wherein the image analytics system determines whether the objects are foreground objects based upon appearances of each of the objects by:
   comparing an appearance of the objects relative to static portions of the scene, and storing appearance match results for the appearances of the objects; and
   for each of the objects, comparing time intervals between the appearance match results and concluding whether the objects are dynamic background objects or foreground objects based on the time intervals.

10. A method for a surveillance security system, the method comprising:

a plurality of surveillance cameras generating image data of a scene; and an object tracking system of an image analytics system identifying objects within the image data; and an object analysis system of the image analytics system analyzing the objects to determine whether the objects are dynamic background objects or foreground objects based upon appearances of each of the objects by matching color and edge information for each of the objects against that of static portions of the scene.

11. The method of claim 10, further comprising the image analytics system determining whether the objects are dynamic background objects or foreground objects based upon movement of each of the objects.

12. The method of claim 10, further comprising the image analytics system initially classifying the objects as dynamic background objects, and reclassifying the dynamic background objects as foreground objects upon determining that the objects are foreground objects.

13. The method of claim 10, further comprising the analytics system excluding the dynamic background objects from lists of objects sent in reply messages to the user devices, in response to receiving requests from user devices for the objects.

14. The method of claim 10, further comprising creating bounding boxes for the objects, the objects including both dynamic background objects and foreground objects.

15. The method of claim 10, further comprising the image analytics system determining whether the objects are dynamic background objects or foreground objects by:

tracking positions of the objects within the scene over time and storing position observations for the positions of the objects; and for each of the objects, concluding whether the objects are dynamic background objects when a count of the position observations has not met a threshold number of position observations.

16. The method of claim 10, further comprising the image analytics system determining whether the objects are dynamic background objects or foreground objects by:

tracking positions of the objects within the scene over time and storing position observations for the positions of the objects; and for each of the objects, determining distances between position observations and concluding whether the objects are dynamic background objects or foreground objects based on the distances.

17. The method of claim 10, further comprising the image analytics system determining whether the objects are foreground objects based upon appearances of each of the objects by comparing an appearance of the objects relative to static portions of the scene, and storing appearance match results for the appearances of the objects; and for each of the objects, comparing time intervals between the appearance match results and concluding whether the objects are dynamic background objects or foreground objects based on the time intervals.

\* \* \* \* \*